Jan. 28, 1969   A. C. LEENHOUTS   3,424,961
LOAD RESPONSIVE, STEPPING MOTOR SPEED CONTROL CIRCUIT
Filed May 18, 1966
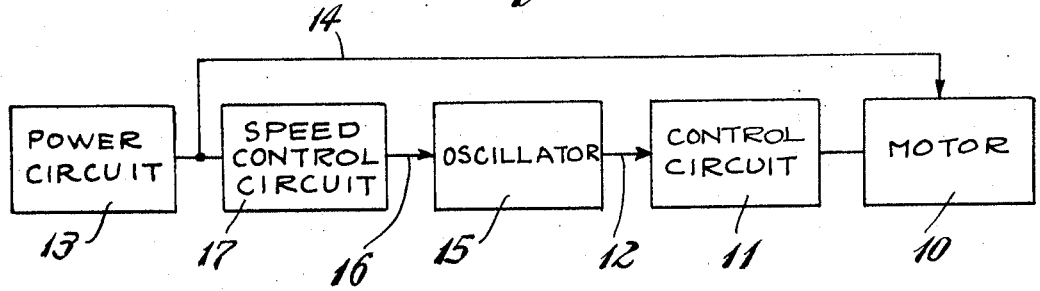
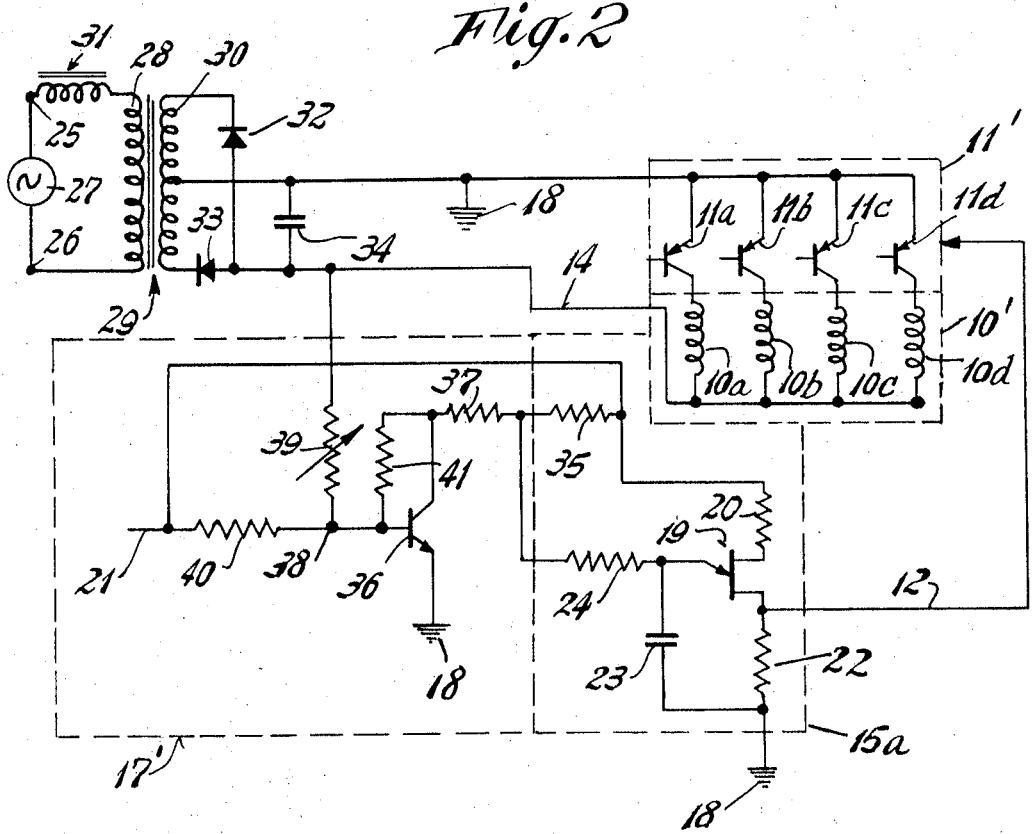
INVENTOR.
Albert C. Leenhouts
BY
Johnson and Kline
ATTORNEYS

United States Patent Office 3,424,961
Patented Jan. 28, 1969

3,424,961
LOAD RESPONSIVE, STEPPING MOTOR SPEED CONTROL CIRCUIT
Albert C. Leenhouts, Granby, Conn., assignor to The Superior Electric Company, Bristol, Conn., a corporation of Connecticut
Filed May 18, 1966, Ser. No. 551,074
U.S. Cl. 318—138         4 Claims
Int. Cl. H02p 7/06; H02k 29/04

ABSTRACT OF THE DISCLOSURE

A stepping motor control circuit for decreasing the speed of the motor as the motor encounters an increase in the resistance of a load that it moves by the increased load decreasing the motor impedance to permit more current to flow but which in turn is decreased by decreasing the voltage to the motor with the voltage decrease producing a signal that decreases the frequency and hence stepping rate at which the motor is operated.

---

The present invention relates to a circuit for regulating the speed at which a stepping motor is operated and more particularly to such a circuit which varies the speed in accordance with the load driven by the motor.

In U.S. Patent No. 3,117,268, granted Jan. 7, 1964, and assigned to the same assignee as the present invention, there is disclosed a motor control circuit that has an output which energizes a plural-winding stepping motor. The circuit causes the windings to be energized in a repeated, multi-step sequence for rotation in one direction with each change in energization producing one step or rotational increment of movement. The circuit produces a change of energization upon application of each input pluse. Thus the circuit causes the motor to advance one step for each input and the steps will occur at substantially the same frequency as the input pulses so that the speed of the motor accordingly may be varied by varying the pulse rate of the pulses.

In most instances it has been found desirable to operate the motor at substantially the maximum speed at which it has absolute control over its load, i.e. for each change in energization the load will not be so large as to prevent the motor from producing the step. The load, while generally relatively constant, may at indeterminate times increase in value beyond the ability of the motor at its maximum speed to have control over it and the motor may be caused to skip a step by not responding to a change in energization. One example of an indeterminately variable load consists of a milling machine bed moving on ways in which there may be "high spots" which increase the resistance to movement of the bed and hence the load on the motor. If the resistance becomes greater than the ability of the motor, it cannot respond to each pulse. Such an occurrence has been found unsatisfactory particularly if the motor is used in a digital tape control system designed to move the bed one increment for each pulse because the skipping of even one pulse introduces inaccuracies and/or the motor is made to operate at a maximum speed which is less than that at which it normally could function.

It is accordingly an object of the present invention to provide a control circuit for use with a stepping motor which senses the ability of the motor to control the load and responds to an increase in the load by decreasing the speed of the motor.

Another object of the present invention is to provide a circuit which achieves the above object by decreasing the pulse rate of the control pulses with which the motor is coherent to prevent the skipping of movement for a pulse.

A further object of the present invention is to provide a load responsive, stepping motor speed control circuit which is extremely simple in construction, requires few parts and which may be easily and simply incorporated into presently available stepping motor control circuits.

In carrying out the present invention, the stepping motor is described in the above-mentioned Patent No. 3,117,268 and is of the type having a permanently magnetized rotor and a stator formed with a plurality of windings. The motor is energized in a manner recited in said patent by the use of the described electric control circuit which changes the energizations of the stator windings for each step. It will be understood that as the rate of changes of energization of the motor increases, that the impedance of the stator windings will increase and will affect the quantity of current flowing through the windings. For high speed operation a necessary value of voltage is required to be applied across the windings in order to have a quantity of current flow through the windings to produce the desired torque while at low speed operation such a quantity of voltage would cause too much current to flow therein. As set forth in my copending application, Ser. No. 426,634, assigned to the assignee of the present invention, there is described a control circuit for maintaining the current through the motor substantially constant to thus produce a substantially constant torque over a wide range of speed.

In the present invention in order to vary the speed of the motor, the voltage to the motor is sensed and is utilized as a control signal to vary the pulse rate of the pulses to the motor control circuit and hence the stepping rate of the motor. The voltage is made inversely related to the current by the circuit disclosed in my above-noted pending application and as the motor encounters a larger than normal load, the rotor inherently is caused to lag behind the stator energizations which decreases the winding impedance and enables more current to flow in the windings. However, as the current tends to increase, the voltage across the motor is decreased to limit the value of current. The decrease in the motor voltage is used to adjust the volage across an oscillator circuit such that as the voltage to the motor decreases, the voltage across the oscillator circuit decreases which decreases the rate of oscillation of the circuit. The output pulses from the oscillator circuit constitute the input pulses to the electric motor controller and thus the speed of the motor will vary with the frequency of oscillation of the oscillator circuit which in turn varies with the voltage across the motor, the latter in turn being responsive to the speed of the motor and its tendency to decrease its speed.

Other features and advantages will hereinafter appear.

In the drawing:

FIG. 1 is a block diagram of a system in which is incorporated the load responsive, stepping motor speed control circuit of the present invention.

FIG. 2 is an electric schematic diagram of the speed control circuit of the present invention with portions of other circuits being shown to illustrate the various interconnections.

Referring to the drawing, a stepping motor 10 is operated by a motor control circuit 11 such that each input pulse on a lead 12 to the control circuit energizes the motor 10 in a manner which will advance it one incremental step. The power to the motor is derived from a power circuit 13 through the lead 14. The power circuit 13 delivers unidirectional power and a full and complete disclosure thereof is found in my above-mentioned copending application, Ser. No. 426,634. The motor 10 and the motor control circuit 11 are fully described in the above-noted U.S. Patent No. 3,117,268.

Connected to the power circuit in parallel with the lead 14 is a unijunction transistor oscillator 15 which each time it "fires," delivers a pulse on the lead 12 to the control circuit 11. The oscillator 15 has an input 16 from a speed control circuit 17, the latter being connected to the output of the power circuit 13 in parallel with the lead 14.

It will be appreciated that the speed control circuit is employed to sense the voltage in the lead 14 and to decrease the rate of oscillation of the oscillator 15 as the voltage in the lead 14 decreases. The oscillator 15 is set to operate at a rate which provides the maximum speed of the motor. However, if the power circuit 13 senses a larger demand for current by the motor than normal, it decreases the voltage in the lead 14 and the speed control circuit 17 then functions to decrease the rate of oscillation of the oscillator 15 which in turn decreases the pulse rate of the pulses to the control circuit 11 and accordingly causes the motor to decrease its speed. On the other hand, if the current flow to the motor for a step is not greater than the normal quantity, the voltage in the lead 14 maintains its substantially constant set value and the oscillator functions at its maximum set speed, the speed control circuit being effectively out of the system.

In the schematic diagram, FIG. 2, the motor 10 is show diagrammatically within the dotted line 10' and has stator windings 10a, 10b, 10c and 10d. Connected to each of the windings are transistors 11a, 11b, 11c and 11d respectively which form a part of the motor control circuit 11 included within the dotted line 11'. When each of the transistors 11a–11d is rendered conducting, it enables current to effectively flow through their respective windings to the lead 14 from a common positive ground 18. The lead 12 from the oscillator circuit 15 to the motor control circuit is only diagrammatically shown. It, however, constitutes the input pulse to the control circuit 11 which responds thereto by changing the energization of the transistors 11a–11d in the proper sequence necessary to effect an incremental step of the motor 10.

The oscillator circuit 15 is included within the dotted line 15a and in the specific embodiment shown consists of a substantially conventional unijunction transistor oscillator though if desired other oscillator circuits may be employed. There is accordingly provided a unijunction transistor 19 having a first base connected through a resistor 20 to a positive potential supply 21 and its second base connected to a resistor 22 to the ground 18. A condenser 23 is connected between the emitter and the ground while a resistor 24 is in the emitter connection. The output lead 12 is connected to the second base. It will be appreciated that the condenser 23 and resistor 24 constitute an R-C network which primarily determines the rate at which the unijunction transistor 19 conducts and hence the pulse rate in the lead 12. It will also be understood that the voltage across the R-C network will also effect the rate of oscillation and if the voltage decreases, the rate decreases.

The power circuit 13 is more fully disclosed in my above-noted application and includes a pair of input terminals 25 and 26 connected to a source of alternating current 27. In series with the input terminals is a primary winding 28 of a transformer 29 having a center-tapped secondary winding 30. Connected in series with the primary winding is an inductance 31. The ends of the winding 30 are connected together to the lead 14 inversely through diodes 32 and 33 while the positive ground 18 is connected to the center tap of the winding 30. A filtering condenser 34 is connected between the lead 14 and the ground. The power circuit 13 is accordingly a rectifying circuit producing a negative voltage on the lead 14 while the positive is connected to the ground. The inductance 31 constitutes a voltage dropping device with the value of the voltage drop being directly related to the value of the current flowing therethrough. While other impedances may be employed, a primarily inductive impedance is preferred as it produces only a small quantity of heat.

The substantially constant positive potential 21 is applied to the resistor 20 and hence to the first base of the unijunction transistor 19 and through a resistance 35 to the resistor 24 and condenser 23. When the potential so applied remains constant in value, the unijunction transistor circuit will oscillate at a set substantially constant frequency. However, to change the frequency thereof, the voltage applied to the resistor 24 and condenser 23 is altered by the speed control circuit 17 that in FIG. 2 includes the components enclosed by the dotted line 17'. The speed control circuit includes a transistor 36 having an emitter connected to the positive ground 18 and a collector connected to a resistance 37 that is subsequently connected through the resistance 35 to the constant positive potential 21. The base of the transistor 36 is connected to a junction 38 of an adjustable resistance 39 having its other end connected to the lead 14 and a resistance 40 connected to the positive potential 21. A gain-reducing resistor 41 is connected between the base and collector.

In normal operation when the motor is being operated at its maximum speed, the transistor 36 is substantially non-conducting in its collector-emitter path by the value of the negative potential at the junction 38 being insufficiently positive with respect to the emitter to effect conduction. Accordingly voltage to the resistor 24 and condenser 23 from the potential source 21 is at the value which produces the desired maximum pulse rate of the unijunction transistor oscillator circuit. The collector-emitter path of the transistor 36 and the resistance 37 are interconnected with the resistance 35 to form a voltage divider such that the voltage to the resistor 24 and condenser 23 will vary inversely with the resistance of the emitter-collector path of the transistor 36. As the transistor 36 conducts more, the voltage to the R-C network decreases which will cause the rate of oscillation of the oscillator to decrease.

The conduction of the transistor 36 is basically controlled by the potential at the junction 38 as the emitter voltage is substantially constant, i.e. ground. The voltage at the junction 38 is derived from the values of the negative potential in the lead 14 and the positive potential 21 with the resistances 39 and 40 interconnected to each respectively. In normal operation at high speeds, the potential at the point 38 is negative as the value of the negative potential in the lead 14 is greater than the positive potential of the source 21 and hence prevents conduction of the transistor 36. When the motor 10 encounters a greater resistance to movement, the rotor will tend to lag behind the stator energizations which causes a greater quantity of current to flow through the motor windings. The inductance 31 then increases its voltage drop with a greater quantity of current flowing and thus decreases the negative potential in the lead 14 for the next step. The decrease in the value of the potential in the lead 14 is transferred to the junction 38 which decreases the negative potential on the base of the transistor 36. Accordingly, as the base becomes less negative with respect to the emitter, the transistor begins conduction. This in turn lowers the voltage to the resistor 24 and condenser 23 which then decreases the repetition rate of the oscillator 15.

As the motor continues to encounter a greater resistance to movement, the rotor lag increases which enables more current to flow but the increase in current increases the voltage drop in the inductance 31 to further decrease the negative voltage in the lead 14 which in turn decreases the repetition rate of the oscillator. When the speed of the motor has been caused to be decreased sufficiently so that there is a balancing between the pulse rate and the voltage in the lead 14, the voltage thereacross produces a frequency rate which maintains the current substantially constant and the motor will maintain this speed until the extra resistance to movement has been overcome. At this time, the motor will decrease the rotor lag, the stator windings will draw less current and the voltage drop across the inductance 31 will decrease. The voltage in the lead 14 will then increase negatively, decreasing the conduction of the transistor 36 and increasing the voltage to the resistance 24 and condenser 23 of the oscillator circuit 15 to thus increase its repetition rate until it achieves its maximum repetition rate when the transistor 36 ceases substantial conduction.

The adjustable resistance 39 enables a user to adjust the circuit so the decrease in the pulse rate may be correlated to the value of the negative voltage in the lead 14.

It will be understood that a change in speed of the motor without a skip or a loss of coherence with each pulse varies with the capability of the motor to absolutely control its load. As the circuit varies the speed, it does so in a manner which requires that the motor not be subjected to an instantaneous large change in the load in order to function. Thus while an abrupt load increase may cause the motor to skip a step, such is not encountered in the usual environment in which the load responsive, stepping motor speed control circuit of the present invention is employed. Moreover, it will be further appreciated that the circuit of the present invention is preferably employed at high stepping speeds where normally when the speed of the load decreases, the torque required to move the load decreases.

Variations and modifications may be made within the scope of the claims and portions of the improvements may be used without others.

I claim:

1. In combination with a stepping motor and motor control system wherein the motor includes a plurality of poles and winding means associated with the poles for magnetizing them, said control system includes means for changing the energization of the windings at a substantially constant normal rate to produce one increment of movement for each change with all poles being normally magnetized, means for supplying electrical energy to the change of energization means and including means for decreasing the voltage of the electrical energizing as the windings permit more current to flow and in which the motor is adapted to operate a load having a varying resistance to movement with an increasing load resistance causing the means for decreasing the voltage to be effective, the improvement comprising means for providing a signal of the decrease in voltage to the change of energization means and means for receiving the signal and decreasing the rate of changes of energization to the motor to reduce its speed as it encounters an increase in the resistance of the load.

2. The invention as defined in claim 1 in which there is oscillator means for supplying pulses to the change of energization means at a normal rate with each pulse producing a change of energization and the means for decreasing the rate of changes of energization includes means for decreasing the repetition rate of the supplied pulses from the oscillator means.

3. The invention as defined in claim 2 in which the oscillator means includes a resistance-capacitor network and the means decreasing the repetition rate includes means for decreasing the voltage across the network.

4. The invention as defined in claim 3 in which the means for decreasing the repetition rate includes a terminal adapted to be connected to a source of substantially constant potential, a variable impedance including a transistor having a base, emitter and collector, said emitter-collector path being interconnected with the terminal, means for connecting the base to the terminal to apply a potential thereto which would normally cause said transistor to have a low impedance in its emitter-collector path and means for applying to the base the signal constituting a potential related to the value of the voltage of the power supply, said signal opposing the potential at the base from the terminal.

References Cited

UNITED STATES PATENTS

| 3,243,681 | 3/1966 | Dannettell | 318—332 |
| 3,331,003 | 7/1967 | King | 318—231 |
| 3,358,205 | 12/1967 | Wechsler | 318—332 |
| 3,368,128 | 2/1968 | Parrish | 318—138 |

ORIS L. RADER, *Primary Examiner.*

G. SIMMONS, *Assistant Examiner.*

U.S. Cl. X.R.

318—171, 327, 332, 341